United States Patent [19]

de Groot

[11] Patent Number: 5,598,265
[45] Date of Patent: Jan. 28, 1997

[54] METHOD FOR PROFILING AN OBJECT SURFACE USING A LARGE EQUIVALENT WAVELENGTH AND SYSTEM THEREFOR

[75] Inventor: Peter de Groot, Middletown, Conn.

[73] Assignee: Zygo Corporation, Middlefield, Conn.

[21] Appl. No.: 417,793

[22] Filed: Apr. 6, 1995

[51] Int. Cl.$^6$ .................................................. G01B 9/02
[52] U.S. Cl. .................................... 356/360; 356/359
[58] Field of Search ................................. 356/359, 360, 356/346

[56] References Cited

U.S. PATENT DOCUMENTS

| | | | |
|---|---|---|---|
| 3,958,884 | 5/1976 | Smith . | |
| 4,325,637 | 4/1982 | Moore | 356/359 |
| 4,340,306 | 7/1982 | Balasubramanian | 356/360 |
| 4,355,899 | 10/1982 | Nussmeier | 356/358 |
| 4,498,771 | 2/1985 | Makosch | 356/351 |
| 4,902,133 | 2/1990 | Tojo et al. | 356/356 |
| 5,206,704 | 4/1993 | Huber et al. | 356/356 |
| 5,402,234 | 3/1995 | Deck | 356/357 |

OTHER PUBLICATIONS

*Optical Shop Testing*, second edition, edited by Daniel Malacara (Wiley, New York, 1992), Chapter 16, "Moiré and Fringe Projector Techniques," pp. 653–685.

*Optical Shop Testing*, second edition, edited by Deniel Malacara (Wiley, New York, 1992), Chapter 1, "Newton, Fizeau, and Haidinger Interferometers," pp. 1–49.

C. R. Munnerlyn and M. Latta, "Rough surface interferometry using $CO_2$ laser source," (Appl. Opt. 7(9) 1858–1859 (1968).

R. René Benoî, "Application des phénomenes d'interférence a des déterminations métrologiques" J. de Phys. 3(7), 57–68 (1898).

C. Joenathan, B. Franze, H. J. Tiziani, "Oblique incidence and observation electronic speckle–pattern interferometry," (Applied Optics 33(31), 7307–7311, (1994).

W. Jaerisch, G. Makosch, "Optical contour mapping of surfaces" (Applied Optics 12(7), 1552–1557 (1973)).

P. Jacquot, X. Colonna de Lega, P. M. Boone, "Common–path interferometer for flatness testing," (SPIE 2248 Optics for productivity in manufacturing, paper 18 (1994), pp. 125–135.

P. de Groot, L. Deck, "Three–dimensional imaging by sub–Nyquist sampling of white–light interferograms," (Opt. Lett. 18(17), 1462–1464 (1993)).

T. Dresel, G. Haeusler, H. Venzke, "Three–dimensional sensing of rough surfaces by coherence radar," (Applied Optics 3(7), 919–925 (1992)).

*Primary Examiner*—Samuel A. Turner
*Assistant Examiner*—Amanda Merlino
*Attorney, Agent, or Firm*—Bryan Cave LLP

[57] ABSTRACT

A method and system for profiling an object surface at a convenient working distance to the object using desensitized interference images. The optical profiler system comprises a desensitized interferometer characterized by an equivalent wavelength much longer than the wavelength of the source light, a mechanical scanning system, and electronic detection and data processing means. Data for one or more image points or pixels in the field of view of the interferometer are generated by displacing the object with respect to the interferometer while at the same time recording detector data in electronic memory. The variation of intensity as a function of scan position may be described as an approximately oscillator signal related to the equivalent wavelength, modulated by a signal envelope that limits the interference effect to a range within the equivalent coherence length. The oscillatory signal corresponds to interference fringes, and the envelope is the fringe contrast. In a further step, the array of interferograms is analyzed by a computer to determine the surface height corresponding to each image pixel. Finally, in a method of the invention, the interferograms are transformed into the spatial frequency domain by Fourier analysis, and the surface height for each point is obtained by examination of the complex phase as a function of spatial frequency.

33 Claims, 5 Drawing Sheets

METHOD FOR PROFILING AN OBJECT SURFACE USING A LARGE EQUIVALENT WAVELENGTH AND SYSTEM THEREFOR

CROSS-REFERENCE TO RELATED APPLICATIONS

This application is related to my commonly owned, copending U.S. patent applications entitled "Method and Apparatus For Profiling Surfaces Using Diffractive Optics", Ser. No. 08/334,939 filed Nov. 7, 1994, and Ser. No. 08/365,589, filed Dec. 28, 1994, the contents of which are specifically incorporated by reference herein, and is an improvement thereon.

FIELD OF THE INVENTION

The invention relates generally to precision metrology for imaging and analysis of surfaces, and more particularly, to optical non-contact methods of surface profiling.

BACKGROUND AND PRIOR ART

A common manufacturing problem is the precise measurement of surface topography. Examples of manufactured items requiring metrology are engine parts, components for magnetic storage devices, flat-panel displays, molded and textured plastic surfaces, mechanical pump surfaces and seals, and minted coins. Efficient production requires high-speed, automated quality control in an industrial environment.

The most common measurement tools for profiling surfaces are mechanical styli, which are very slow, provide only limited information, and may damage the object surface. Automated systems commonly referred to as coordinate measurement machines are expensive, slow, and typically are used only off line rather than for continuous in-line quality control. Mechanical gauges such as micrometers and calipers have low accuracy and cannot provide profiles of surface topography. It would be very desirable therefore to provide high-speed, non-contact optical means of profiling of objects both off line and in line for precision manufacturing. Such means should accommodate a variety of object sizes, surface forms and surface textures. Such means should also be compatible with automated parts handling in an industrial environment and be insensitive to vibration.

The prior art provides several optical profiling techniques based on geometric optics. A representative example is moiré fringe analysis. This technique is described in detail in Chapter 6 of the book *Optical Shop Testing*, second edition, edited by Daniel Malacara (Wiley, New York, 1992). The moiré method involves the projection and imaging of a ronchi ruling or like periodic structure, and is equivalent to geometric triangulation. A commercial product based on this principle is the Chek-flat, manufactured by Speedfam-Spitfire products group (Des Plaines, Ill.). Although moiré is capable of profiling rough surfaces, it is generally of low accuracy when compared to mechanical stylus gauges, and in some cases does not work at all for specular surfaces. A further difficulty is that moiré must be carefully calibrated for geometric errors, which are most troublesome when the object surface has large depth variations.

The prior art also provides several metrology methods using optical interferometry, which exploits the wave nature of light to map variations in surface height with high accuracy. Examples of common interferometers are given in Chapters 1 of the book *Optical Shop Testing*, second edition, edited by Daniel Malacara (Wiley, New York, 1992). Most of these conventional prior-art interferometric means cannot accommodate surface features with discontinuous height variations or surface roughness that exceed one-quarter-of the wavelength of the source light, which is typically 0.63 µm in commercial instruments. Discontinuous surface features larger than 0.16 µm therefore result in interferometric phase ambiguities that are difficult or impossible to interpret. A further difficulty arises when the surface slope is so large that it becomes difficult to resolve or distinguish the interference fringes. Consequently, interferometers are not considered appropriate for a great number of manufacturing metrology problems.

Because of the limited range of application for conventional interferometers, the prior art provides some alternative interferometric methods and means which are compatible with rough surfaces and large variations in surface topography. One obvious approach is to increase the wavelength of the light through the use of unusual sources. An example method and apparatus is disclosed in the paper "Rough surface interferometry using a $CO_2$ laser source," by C. R. Munnerlyn and M. Latta (Appl. Opt. 7(9) 1858–1859 (1968)). However, such methods are generally very expensive and cumbersome, since they involve specialized sources, optics and detectors. Further, even these expensive long-wavelength interferometers fail in the presence of discontinuous variations in surface topography that exceed one-quarter of the longer wavelength.

Another prior-art approach to overcoming the limited range of conventional interferometers involves the use of multiple wavelengths, as originally described by R. René Benoît in the paper "Application des phénomènes d'interférence a des déterminations métrologiques," J. de Phys. 3(7), 57–68 (1898). A sequence of measurements at two or more wavelengths provides a much larger equivalent wavelength that overcomes some of the ambiguity problems of conventional single-wavelength interferometers. A method for applying this technique to surface metrology is disclosed in U.S. Pat. No. 4,355,899, "Interferometric distance measurement method," to T. A. Nussmeier (1982). However, these multiple wavelength techniques still do not function correctly when the surface slope is so large or the roughness so great that it becomes difficult to resolve the interference fringes. Multiple-wavelength interferometers are also extremely sensitive to vibration.

The prior art provides some alternative interferometric methods that seek to reduce the sensitivity to surface roughness and surface slope through the use of unusual measurement geometries. A representative prior-art desensitized interferometer employs an oblique angle of illumination, such as is described in the U.S. Pat. No. 4,325,637 "Phase modulation of grazing incidence interferometer" to R. C. Moore, and in the article "Oblique incidence and observation electronic speckle-pattern interferometry" by C. Joenathan, B. Franze, and H. J. Tiziani (Applied Optics 33(31), 7307–7311, (1994)). In these so-called grazing incidence interferometers, oblique angles of illumination and observation reduce the fringe density on the object surface when compared with the more common forms of interferometer. This reduced fringe density corresponds to an equivalent wavelength $\Lambda$, which may be many times longer than the actual wavelength $\lambda$ of the light. The larger the equivalent wavelength $\Lambda$, the greater the degree of surface roughness that can be accommodated by the instrument. However, a significant reduction in sensitivity requires a large illumination angle with respect to normal incidence. Such large angles create problems with proper illumination and imaging of the object. There may also be undesirable shadowing from surface features such as steps and channels. Additional complications arise from the need to properly balance the reference and object beams of the interferometer to compensate for variations in surface reflectivity. Further, grazing-incidence interferometers cannot accommodate surface features with discontinuous height variations that exceed one-quarter of the equivalent wavelength $\Lambda$.

Another geometric approach to generating interference patterns with a long equivalent wavelength is to divide the source light into two beams which illuminate the same portion surface at different angles of incidence. When these beams are recombined, the resulting interference pattern has a much reduced sensitivity to variations in surface topography. This reduced fringe density can also be characterized by an equivalent wavelength $\Lambda > \lambda$; however, this method does not necessarily involve extreme angles of illumination, and has the additional benefit that the interfering beams are balanced in intensity. Instruments employing different angles of illumination and observation to achieve a long equivalent wavelength are referred to in the present disclosure as desensitized interferometers.

The prior art provides several examples of desensitized interferometers. In an article by W. Jaerisch and G. Makosch entitled "Optical contour mapping of surfaces" (Applied Optics 12(7), 1552–1557 (1973)) there is described a desensitized interferometer which employs a diffraction grating placed nearly in contact with the test surface. Illumination of the grating by a monochromatic plane wave generates several beams corresponding to different diffraction orders. These beams are reflected off of the object surface and are recombined by the grating, resulting in a fringe pattern that resembles the surface contours of the object surface. Another prior-art approach involving light beams at different angles of illumination is described in a paper "Common-path interferometer for flatness testing" by P. Jacquot, X. Colonna de Lega and P. M. Boone (SPIE 2246, Optics for productivity in manufacturing, paper 18 (1994)). This instrument works by the interaction of two diffraction orders of a holographic recording of a spherical wavefront.

Although the method of Jaerisch and Makosch and the method of Jacquot et al. have some advantages, they are not suitable for automated optical inspection, because they do not provide an adequate working distance. Both of these methods require placing a diffractive element nearly in contact with the object surface. This is because in both of these methods a single diffractive element divides the source light into beams which propagate in different directions and do not illuminate the same part of the object surface. The two beams are therefore not properly oriented for generating the desired interference effect, especially on rough surfaces. The only way to avoid this problem is to bring the object very close to the surface of the diffracting element. Typically, the working distance, defined as the distance of the object to any element of the interferometer, is less than 100 µm for these systems. This is much too small a distance for most manufacturing inspection needs.

A few prior-art forms of desensitized interferometer employing two angles of illumination do not require the object to be nearly in contact with a component of the interferometer. A representative example is taught in U.S. Pat. No. 3,958,884 to F. H. Smith. Smith teaches several methods of dividing and recombining the source light using combinations of refractive and polarizing components, in such a way that the working distance is large. These methods include the use of a Jamin interferometer, a bi-refringent doublet, a bi-refringent doublet prism, or a Savart-doublet plate. A further example of a desensitized interferometer with a large working distance is provided by U.S. Pat. No. 4,498,771 "Method and means for interferometric surface topography," to G. Makosch (3:37–4:16). The apparatus disclosed by Makosch uses a birefringent crystal, such as a Wollaston prism, and a system of mirrors to direct the light beam to the object.

A disadvantage of desensitized interferometers when used with broadband or diffuse illumination is that the useful measurement depth is limited by the coherence of the light. Briefly explained, "coherence" refers here to the ability of the light source to generate interference fringes when the light is divided into two parts and recombined. Generally, the quality or contrast of the fringes declines with the difference in optical path traversed by the two beams. An incoherent source will only produce high-contrast fringes when the object is precisely positioned so that the optical path difference between the interfering beams is approximately equal to zero. The behavior of a desensitized interferometer with an incoherent source is analogous to that of a conventional white-light interferometer, such as a Mirau microscope objective, the difference being that the scale of the interference effects is enlarged. Here the term "white light" refers to any illumination that is characterized by a large spectral distribution when compared to lasers, low-pressure arc lamps and like sources of substantially monochromatic radiation. The practical consequence is that when the source is incoherent, fringes appear over only that portion of the object which falls within a small depth range along the optical axis of the interferometer. This depth range may be as small as a few times the equivalent wavelength, and is therefore too small for many kinds of large manufactured objects.

A few prior-art forms of desensitized interferometer employing two angles of illumination are insensitive to the wavelength of the source, and therefore function well in white light. One such system is disclosed in my copending United States Patent Applications entitled "Method and apparatus for profiling surfaces using diffractive optics", bearing U.S. Ser. Nos. 08/334,939 and 08/365,589, filed Nov. 7, 1994 and Dec. 28, 1994, respectively. By using combinations of two or more diffractive elements, the apparatus described in the aforementioned copending patent applications, the contents of which are specifically incorporated by reference herein their entirety, projects the plane of measurement to a convenient working distance. The preferred embodiments taught by these applications has an equivalent wavelength $\Lambda$ that is substantially independent of the source wavelength $\lambda$. Therefore a variety of light sources may be used, including white-light sources. However, if the source is extended, that is, if it has a large emission area and, therefore, emits a spatially incoherent beam, the fringes appear over only that portion of the object which falls within a small depth range along the optical axis of the interferometer. This depth range may also be as small as a few times the equivalent wavelength, and is therefore also too small for many kinds of large manufactured objects.

If the object surface is rough, there is a general difficulty with all desensitized interferometers which employ beams at different angles of incidence. Good-quality fringes can only be obtained on a rough surface when the two beams impinge upon the surface at substantially the same place, even when the source light is perfectly coherent. Therefore when the object surface is rough, the measurement can only be performed over a small depth range along the optical axis of the interferometer. This characteristic of all geometrically-desensitized interferometers severely limits their usefulness.

From these observations, it may be concluded that prior-art desensitized interferometers have many advantages for certain measurement tasks that are facilitated by a long equivalent wavelength; however, they have many limitations in their ability to accommodate manufactured parts having large variations in surface topography. Further, none of the desensitized interferometers described here are capable of measuring objects having discontinuous surface features or average surface roughness exceeding one-quarter of the equivalent wavelength.

An entirely different interferometric measurement technique for surface topography measurement is based on a mechanical scanning mechanism and a conventional interferometer operating with white light. This technique is referred to in the present disclosure as scanning white-light interferometry or SWLI. A representative method for three-dimensional measurement of surface topography using SWLI is disclosed in U.S. Pat. No. 4,340,306 to N. Balasubramanian. This patent describes a white-light interferometer that includes a mechanically-scanned reference mirror, a two-dimensional detector array, and computer control. The disclosed method involves scanning either the reference mirror or the object in discrete steps, measuring the fringe contrast for each pixel at each scan position, and in this way determining for each surface point the position of maximum fringe contrast. The scan position for which the contrast is maximum is a measure of the relative height of a particular surface point. The SWLI method as taught by Balasubramanian is suitable for some specular surfaces such as optical components.

Another prior-art SWLI technique is taught in a copending United States Patent Application entitled "Method and apparatus for surface topography measurement by spatial-frequency analysis of interferograms", bearing U.S. Ser. No. 08/014,707 filed Sep. 9, 1994. This disclosed optical system for measuring the topography of an object is comprised of an interferometer with a multiple-color or white-light source, a mechanical scanning apparatus, a two-dimensional detector array, and digital signal processing means for determining surface height from interference data. Interferograms for each of the image points in the field of view are generated simultaneously by scanning the object in a direction approximately perpendicular to the surface illuminated by the interferometer, while recording detector data in digital memory. These interferograms are then transformed into the spatial frequency domain by Fourier analysis, and the surface height for each point is obtained by examination of the complex phase as a function of spatial frequency. The final step is the creation of a complete three-dimensional image constructed from the height data and corresponding image plane coordinates.

Although the various prior-art SWLI methods and means are useful for certain kinds of objects and surfaces, they all suffer from important and fundamental disadvantages, including a small field of view, high sensitivity to variations in object reflectivity, and slow measurement time relative to most other forms of optical surface metrology, and a high sensitivity to vibration. These limitations are related to the wavelength of the light and the corresponding fringe density.

One of the most important fundamental disadvantages of prior-art SWLI is that the field of view is generally no larger than can be accommodated by standard microscope objectives. To function correctly, the detector that electronically records the interference data for a SWLI instrument must have sufficiently high resolution when compared with the interference fringe density. When the field of view of prior-art SWLI instruments is increased, the fringe density can easily become too high to resolve, especially when dealing with rough surfaces. The slope tolerance for specular surfaces decreases linearly with the field size, and the speckle effects required for rough-surface measurements are only resolvable if the numerical aperture (NA) of the objective decreases linearly as the field increases. The need to resolve the speckle pattern from rough surfaces is the most discouraging, since the amount of collected light decreases with the square of the NA. The light loss means that larger surfaces require a more powerful illuminator. Worse, the fringe contrast is now a highly variable parameter, and the quality of the measurement depends critically on the balance between the reference and object beam intensities.

Because of the difficulty in measuring large surface areas, the only available commercial instruments based on SWLI are microscopes, which accommodate a circular field of view typically less than 5 mm in diameter, such as the NewView 100 by Zygo Corporation, the RST by WYKO Corporation (Tucson, Ariz.), the MICROXAM-EX by Phase-Shift Technologies (Tucson, Ariz.), and the 512 Optical Profiler by MicroMap (Tucson, Ariz.). Therefore, in spite of the substantial need for metrology tools for manufacturing, the prior art does not provide SWLI instruments for anything other than microscopic parts.

Another fundamental disadvantage of prior-art SWLI techniques is that data acquisition is very slow. The RST manufactured by WYKO Corporation, for example, acquires data at the rate of 0.5 microns of surface depth per second. A surface with 1 mm surface features would therefore require over 30 minutes to scan. The slow speed is a consequence of the rapidly varying interference effect as a function of scan position. Accurate measurements require that these variations be recorded in detail, usually at the rate of one measurement per pixel per 75 nm of scan motion. The slow speed creates additional problems such as a high sensitivity to vibration, thermal distortions and mechanical strain during the measurement.

Another fundamental disadvantage of SWLI is its high sensitivity to vibration, which is due in part to the slow data acquisition speed, and in part to the extremely high sensitivity of the interference fringe pattern, which is easily corrupted by very small amounts of vibration. A SWLI instrument generally requires massive mounting fixtures and expensive vibration isolation. Even with these precautions, SWLI instruments are still restricted to relatively calm environments when compared to normal production environments.

As a consequence of the urgent need for high-speed, large-area metrology of manufactured parts, several prior-art attempts have been made to expand the range of application for SWLI. For example, a method taught in a paper entitled "Three-dimensional imaging by sub-Nyquist sampling of white-light interferograms," by P. de Groot and L. Deck (Opt. Lett. 18(17), 1462–1464 (1993)) involves sparse data sampling in order to improve the speed of data acquisition and therefore improve the depth range of the instrument. Nonetheless, even with sparse data sampling the SWLI approach remains fundamentally slow because of the need to accurately sample the high-density interference fringe pattern. Another prior-art attempt to increase the speed of measurement in a SWLI microscope is disclosed by L. Deck in the commonly owned U.S. Pat. No. 5,402,234 issued Mar. 28, 1995 entitled "Method and Apparatus for the Rapid Acquisition of Data in Coherence Scanning Interferometry". The system described by Deck uses a special algorithm and a data buffer to select out and store the most useful part of the interferogram for each pixel. This method substantially reduces the amount of data processing required to generate a three-dimensional image. The principles taught by Deck have been incorporated in the NewView 100 product manufactured by Zygo Corporation (Middlefield, Conn.). However, the NewView 100 still requires accurate data samples of a high-density interference fringe pattern. Consequently, the measurement speed is still very slow, and acquires data at the rate of only 2 microns of surface depth per second Another prior-art attempt to increase the useful applications SWLI is described in an article by T. Dresel, G. Haeusler and H. Venzke entitled "Three-dimensional sensing of rough surfaces by coherence radar," (Applied Optics 31(7), 919–925 (1992)). This disclosed optical system has an adjustable NA to increase the average speckle size from large, rough surfaces, and an unusual combination of two mechanical actuators, one for displacing the reference mirror over a small range, and another for scanning the object in discrete steps. Several figures in the article show graphical images of three-dimensional objects, including objects larger than 5 mm in diameter. However, the low light levels for large objects and the need to process huge amounts of data severely limit the practical value of the instrument. Also, the data acquisition procedure is exceptionally slow and unsuited to rapid optical inspection.

Thus prior art attempts to increase useful applications of SWLI can be summarized as follows: mechanical styli are useful for measuring some surface features, but are very slow, provide only limited information, and may damage the object surface; prior-art optical instruments based on geometrical optics are generally less accurate than those provided by mechanical styli and do not work on all types of surfaces; conventional interferometers are useful for very-high precision measurements of optical components, but are not suitable for most manufacturing inspection tasks; multiple-wavelength interferometers can solve some of the ambiguity problems with steps and channels on specular surfaces, but suffer from nearly the same restrictions on surface slope and roughness as single-wavelength interferometers; desensitized interferometers are advantageous for surfaces which are most easily viewed with a large equivalent wavelength, but do not work well if the surface has a large depth variation when compared to the equivalent wavelength, or when the surface has discontinuous features larger than one-quarter of the equivalent wavelength; and SWLI methods have a small field of view, are sensitive to variations in surface reflectivity, are very slow, and are extremely sensitive to vibration.

Therefore, in spite of the urgent need for non-contact optical means of profiling of objects for precision manufacturing, the prior art does not provide such means. The known methods of optical surface profiling are not compatible with an industrial environment, do not have sufficient flexibility in the size, form and texture of surfaces, and are not compatible with automated parts handling. There is accordingly an unmet need for an accurate, high-speed and flexible method and apparatus for a precise measurement of surface topography.

SUMMARY OF THE INVENTION

In accordance with the instant invention, I provide an optical profiler comprised of a desensitized interferometer illuminated by a light source, which may, for example, be an incandescent lamp, a light-emitting diode, or a laser. The desensitized interferometer is characterized by an equivalent wavelength $\Lambda$ larger than the source wavelength $\lambda$; a convenient working distance to the object (e.g. greater than 1 mm), and the ability to create high-contract interference fringes within a depth range L, defined as the equivalent coherence length. A camera with an array of photodetectors transduces the interference pattern into electrical signals over an array of pixels.

The measurement data for one or more image points, i.e. pixels, in the field of view of the interferometer are generated by displacing the object with respect to the interferometer by a known amount while at the same time recording photodetector data in electronic memory. The variation of intensity as a function of scan position may be described as an approximately oscillatory signal related to the equivalent wavelength $\Lambda$, modulated by a signal envelope that limits the interference effect to a range within the equivalent coherence length L. The oscillatory signal corresponds to interference fringes, and the envelope of the oscillatory signal is the fringe contrast.

The measurement data is then analyzed by a computer to determine the surface height corresponding to each image pixel. For example, in a method of the invention, the scan position for which the fringe contrast is maximum is a measure of the relative heights of a particular surface point. Alternatively, in another method of the invention, the interferograms are transformed into the spatial frequency domain by Fourier analysis, and the surface height for each point is obtained by examination of the complex phase as a function of spatial frequency.

The instant invention overcomes the range limitations of prior-art desensitized interferometers while at the same time it provides a much larger field of view and higher scan speed than all prior-art scanning white light interferometers.

These and other features of the invention are made more apparent in the ensuing Detailed Description of the Invention when read in conjunction with the attached Drawings.

DETAILED DESCRIPTION OF THE INVENTION

Figure 1:
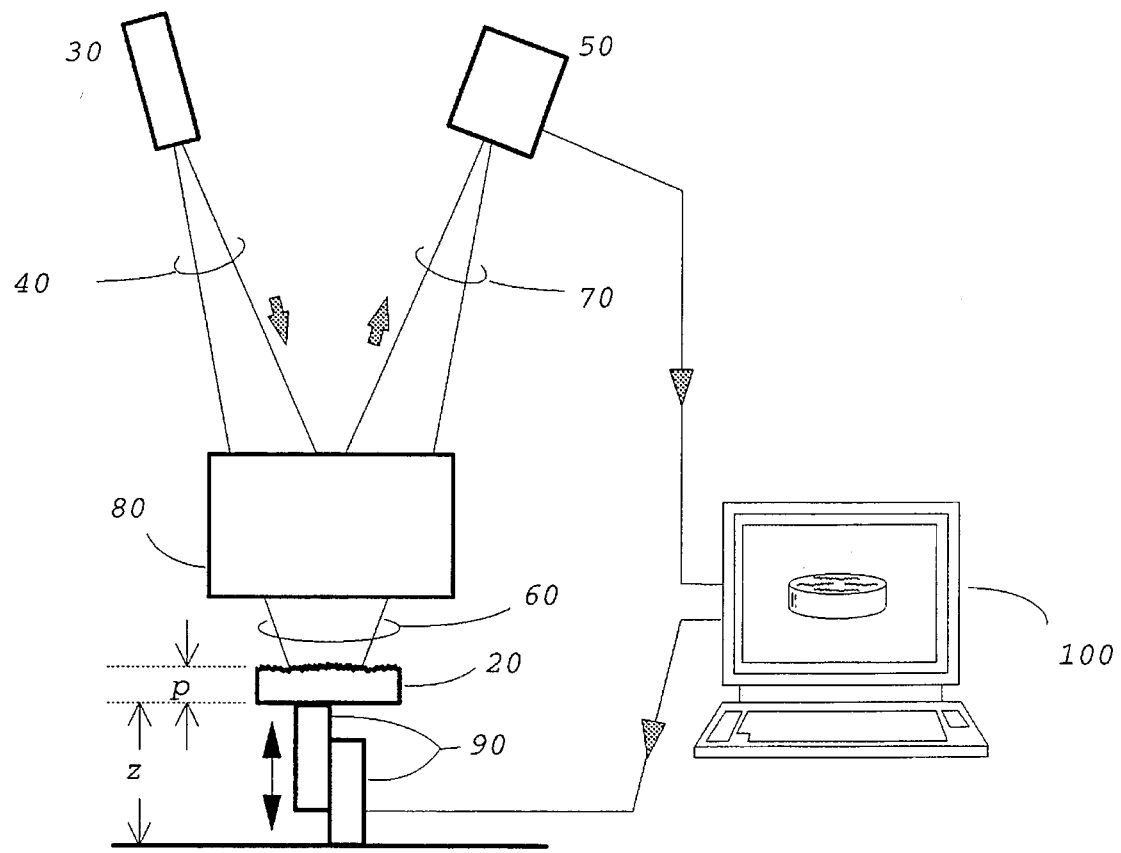
FIG. 1 is a drawing showing the principle components of the method and system of the present invention.

FIG. 1 shows a preferred embodiment of the inventive optical profiler system, setup to measure the surface profile of an object 20. The illumination is provided by source 30, which may for example be an incandescent lamp, a light-emitting diode or diodes, a laser with a diffusing element, or like source of spatially-incoherent illumination. Light beam 40 is directed to an interferometer 50 which is preferably a desensitized interferometer. Interferometer 50 illuminates the object with a beam 60, which may be composed of two or more beams (not shown) illuminating the object in substantially the same place but at different angles of incidence. Interferometer 50 preferably has the following characteristics: an equivalent wavelength $\Lambda$, larger than the source wavelength $\lambda$; a convenient working distance to object 20, for example greater than 1 mm; and the ability to create high-contrast interference fringes within a range L defined here as the equivalent coherence length. Interferometer 50 preferably projects, via beam 70, an interference pattern representative of the object surface onto an electronic detector 80, which may for example be a closed-circuit television camera, a linear detector array, or a single-element detector.

Object 20 is preferably mounted on a mechanical scanning stage 90 disposed so as to displace object 20 in a direction substantially perpendicular to the surface illuminated by the interferometer. The displacement of object 20 by stage 90 is referred to herein as depth scanning. Stage 90 is preferably under control of a computer 100. In a preferred method of the present invention, a plurality of intensity measurements are performed by electronic detector 80 during a continuous depth scan of object 20. The results of these measurements are preferably stored in the dynamic memory (not shown) of computer 100. The data thus acquired is preferably stored in digital format as an array of interferograms, one for each image point or pixel in the field of view of the instrument, representing the variation in intensity as a function of scan position.

Figure 2:
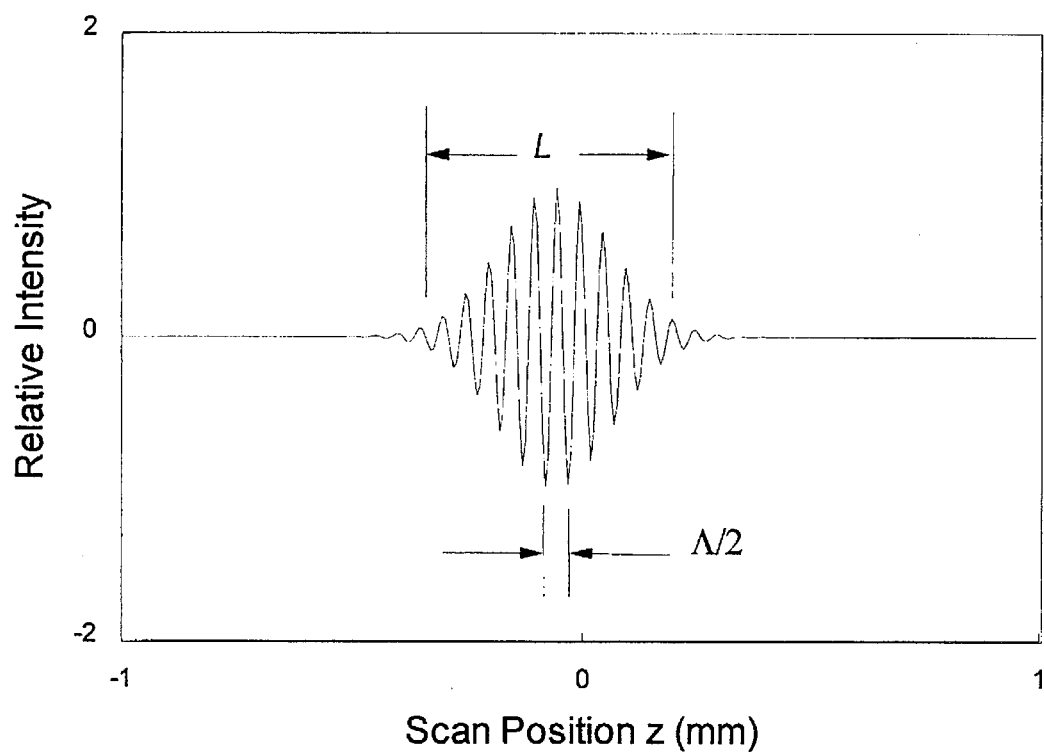
FIG. 2 is a graph depicting the variation in measured intensity as a function of scan position for one pixel in the field of view.

A typical variation in measured intensity as a function of depth for a single pixel is shown in FIG. 2. The periodic oscillations, commonly referred to as interference fringes, are preferably confined to a depth range given by $$|p+z-z_0| \leq L/2 \tag{1.}$$

where L is the equivalent coherence length, p is the local surface height, z is the scan position, and $z_0$ is a constant. The value of p typically preferably varies with the position on the object surface, and is a measure of the object surface topography. By scanning the object over a large range, interferograms for all of the surface points can be preferably collected.

Several methods of analyzing interferograms such as the one shown in FIG. 2 are known in the art. The simplest method involves measuring the strength of the oscillatory signal in the interferogram as a function of scan position. The signal is strongest when $p=z_0-z$. Therefore, the signal strength is an indicator of the surface height p for each pixel. This method makes it possible to measure very large variations in object surface topography even when these variations fall outside the range of the effective coherence length L. Alternatively, the analysis may proceed by frequency-domain analysis, according to principles taught in the copending United States Patent Application entitled "Method and Apparatus for Surface Topography Measurement by Spatial-Frequency Analysis of Interferograms" U.S. Ser. No. 08/014,707 filed Sep. 9, 1994, the contents of which are incorporated by reference herein.

The inventive data acquisition and analysis methods are therefore similar in sequence to those employed in prior-art SWLI systems; however, inasmuch as the interferograms in the inventive apparatus are characterized by an equivalent wavelength $\Lambda$ rather than the source wavelength $\lambda$, the number of data points required for a given scan length is reduced by a factor of $\Lambda/\lambda$ when compared with the prior art. Further, the electronic detection means are able to resolve the interference fringes much more easily than would be possible with an interference pattern characterized by the optical wavelength $\lambda$. Therefore, the measurement area may be substantially increased when compared to the prior art.

Although the various embodiments disclosed here are shown operating with an incoherent source, it is also possible to achieve the goals of the invention with spatially-coherent light, provided that the object surface is sufficiently rough to substantially degrade the spatial coherence of the reflected light. The essential requirement is that the interferometer be characterized by an equivalent coherence length L that is not excessively large. In the context of the presently-known methods of data analysis, a typical range of useful equivalent coherence lengths is given by $$3\lambda \leq L \leq 30\lambda, \tag{2.}$$

although other values of L are possible without departing from the spirit of the invention.

Figure 3:
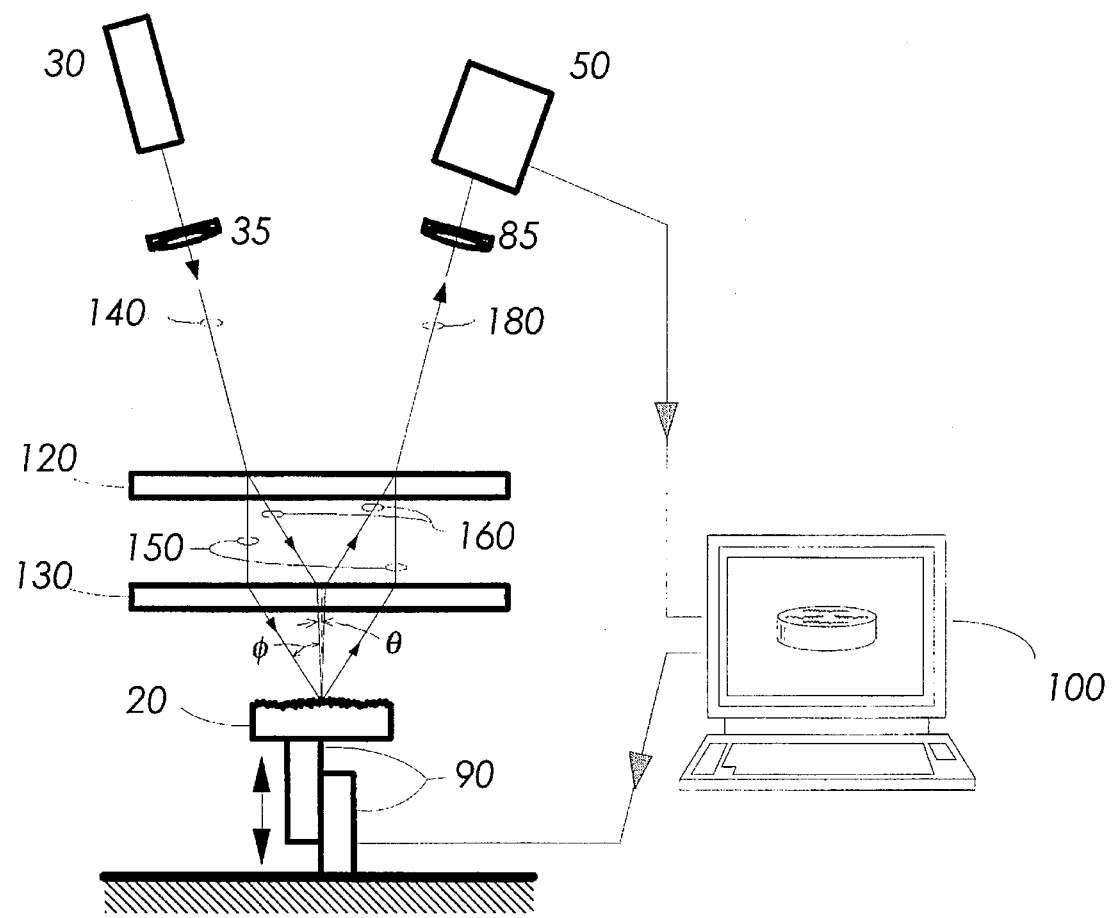
FIG. 3 is a drawing showing the preferred embodiment of the invention.

Referring now to FIG. 3, there is shown an embodiment of the invention, currently preferred, incorporating a specific form of desensitized interferometer, in this case based on the teachings of my commonly owned copending United States Patent Applications entitled "Method and Apparatus for Profiling Surfaces Using Diffractive Optics" U.S. Ser. No. 08/334,939, filed Nov. 7, 1994, and U.S. Ser. No. 08/365,589 filed Dec. 28, 1994. According to a method of the invention employing this apparatus, light from source 30 is collimated by a lens 35 into an illuminating beam 140. Beam 140 impinges first on a grating 120, which divides beam 140 into a beam 150 and a beam 160. In a next step, beams 150 and 160 are diffracted by a second diffraction grating 130, and subsequently impinge upon object 20. Upon reflection, the beams propagate back towards grating 130, which diffracts them in such a way that they recombine at the surface of grating 120. The recombined beams are then diffracted into a common exit beam 180, which is focused onto camera 50, where there is detected an interference pattern representative of the difference in optical path length for beams 150 and 160.

As a consequence of the different incident angles for beams 150 and 160, the vertical displacement of object 20 results in a variation in measured intensity as a function of depth. The variation in intensity measured for one pixel in the image as a function of scan position is substantially the same as that shown in FIG. 2, and is therefore characterized by an equivalent wavelength $\Lambda$ and equivalent coherence length L. The equivalent wavelength may be calculated from the formula $$\Lambda = \frac{\lambda}{\cos(\theta) - \cos(\phi)}. \tag{3.}$$

where $\theta$ is the angle of incidence of beam 160 with respect to surface 170 of object 20, $\phi$ is the angle of incidence of beam 150 with respect to surface 170 of object 20. It is seen that in principle any effective wavelength $\Lambda \geq \lambda$ may be created by suitable choice of angles $\theta$, $\phi$. For example, if $\phi=20$ degree and $\theta=0$ deg, then $\Lambda \approx 16.6\lambda$.

The equivalent coherence length L for the preferred embodiment of FIG. 3 depends on a number of factors, but is primarily related to the degree of surface roughness of object 20 and the size of the emission area of source 30. Therefore, if the size of the emission area is adjustable, or in general if the degree of spatial coherence of the source is variable, it is possible to adjust the size of the equivalent coherence length L to suit the application.

Figure 4:
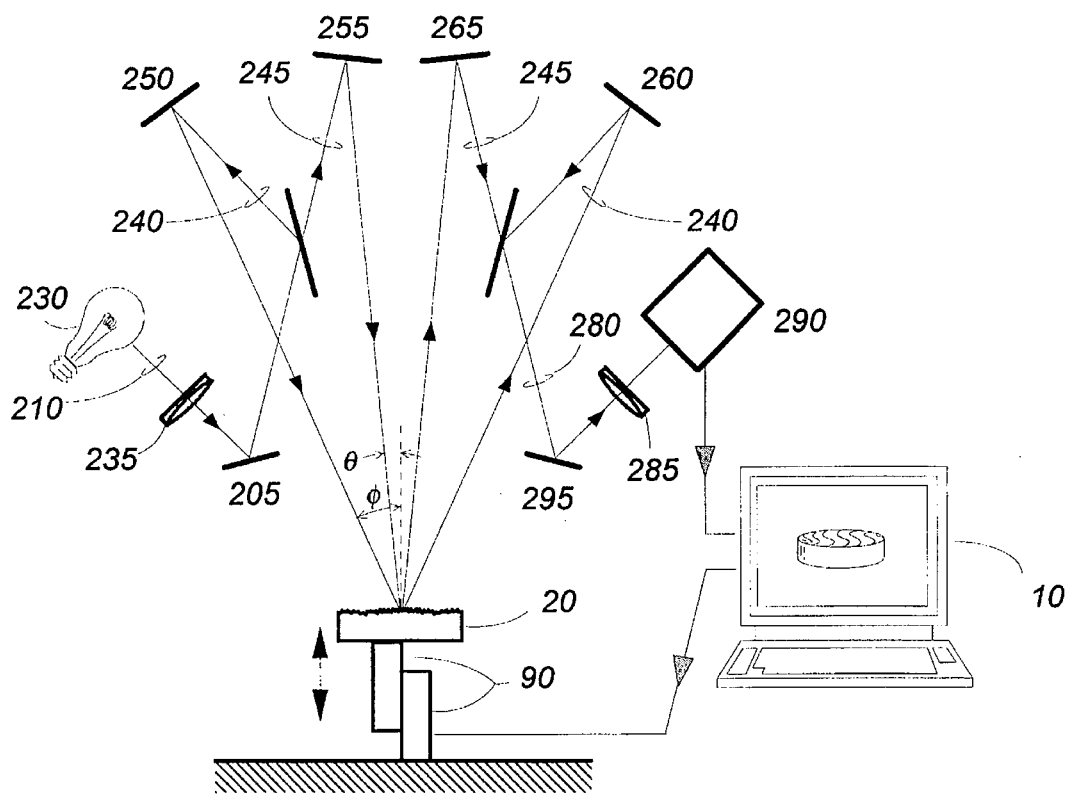
FIG. 4 is a drawing showing an alternative embodiment of the invention.

Referring now to FIG. 4, there is shown an embodiment of the invention employing an alternative form of a desensitized interferometer. In the embodiment shown in FIG. 4, light from source 230 is collimated by lens 235 into a beam 200. Beam 200 is reflected by a fold mirror 205. A beam splitter 210 divides the light into a beam 240 and a beam 245. Beam 240 reflects from a mirror 250 and is directed towards object 20 at an angle of incidence $\phi$. Beam 245 reflects from a mirror 255 and is directed towards object 20 at an angle of incidence θ. After reflection from object 20, beams 245 and 255 reflect from the mirrors 260 and 265, respectively, and are then recombined by a beam-splitter 270 into a beam 275. A lens 285 images object 20 onto a camera 290. When properly adjusted, the various beam paths in the embodiment shown in FIG. 4 result in an interference pattern, but at a reduced equivalent wavelength Λ given by Eq. 3. The interferometer will function with an incoherent light source, when properly adjusted. However, when an incoherent source is used in conjunction with this embodiment, the region of high fringe contrast is limited to the equivalent coherence length L. The equivalent coherence length is related both to the spectral bandwidth of the source and to the size of the source. Other features of the embodiment shown in FIG. 4, such as the data acquisition and analysis procedure, are substantially the same as for previously-described embodiments of the invention.

Figure 5:
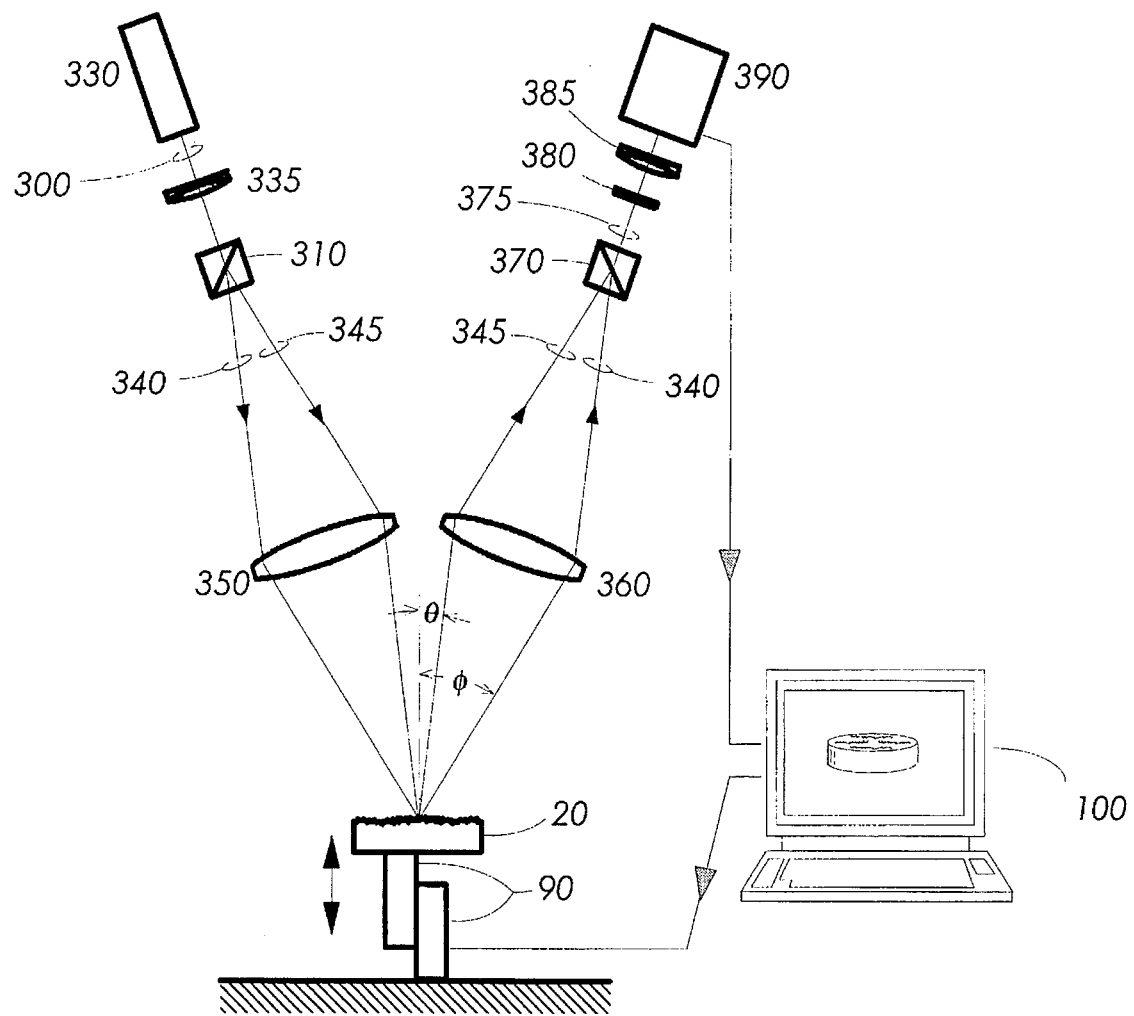
FIG. 5 is a drawing showing another alternative embodiment of the invention.

Referring now to FIG. 5, there is shown another embodiment of the invention employing an alternative form of a desensitized interferometer. In the embodiment shown in FIG. 5, light from source 330 is collimated by lens 335 into a beam 300. Beam 300 is divided into two mutually-orthogonal beams 340 and 345 by a birefringent element 310, which may be a Wollaston prism or like optical component for spatially separating the two polarizations of a light beam. A lens 350 focuses beams 340 and 345 together onto object 20. After reflection from object 20, beams 340 and 345 diverge until they are collected by a lens 360, which focuses them back together again. A birefringent element 370 recombines beams 340 and 345 into a beam 375. A polarizer 380 is oriented so as to combine the projections of the polarizations of beams 340 and 345 into a common polarization, resulting in an interference effect. A lens 385 then images the object onto a camera 390. When properly adjusted, the various beam paths in the embodiment shown in FIG. 5 result in an interference pattern representative of the object topography, but at a reduced equivalent wavelength Λ given by Eq. 3. The interferometer will also function with an incoherent light source, when properly adjusted. However, when an incoherent light source is used in conjunction with this embodiment, the region of high fringe contrast is limited to the equivalent coherence length L. The equivalent coherence length is related both to the spectral bandwidth of the source and to the size of the source. The embodiment of FIG. 5 is best suited to single-point or linear images of object 20. In the case of a single-point or linear image, it may prove advantageous to incorporate lateral scanning mechanisms (not shown) into state 90, so as to facilitate the construction of a full three-dimensional topographical profile of object 20. Other features of the embodiment shown in FIG. 5, such as the data acquisition and analysis procedure, are substantially the same as for previously-described embodiments of the invention.

Those skilled in the art will appreciate that additional substitutions, omissions and changes in form or detail of the disclosed methods and apparatus may be made without departing from the spirit of the invention.

To summarize, some of the advantages of the inventive interferometric profiler and method may be listed as follows: ability to measure both rough and specular surfaces; ability to measure surfaces having large deformations and large slopes; larger potential field of view than prior-art SWLI techniques; higher speed that prior-art SWLI techniques; larger depth range than prior-art desensitized interferometers; greater working distance than most prior-art desensitized interferometers; reduced sensitivity to vibration when compared to most prior-art interferometers; and excellent fringe contrast since both interfering beams reflect from the object surface.

What is claimed is:

1. A method of profiling a surface of an object using desensitized interference fringes from a desensitized interferometer means comprising the steps of:

illuminating said desensitized interferometer means with a source of light having an associated wavelength for providing said desensitized interference fringes, said desensitized interferometer means having an associated equivalent wavelength larger than said light source associated wavelength and an associated equivalent coherence length;

generating measurement data for at least one image pixel in the field of view of said desensitized interferometer means by displacing said object with respect to said desensitized interferometer means for providing a variation of intensity as a function of scan position, said variations of intensity comprising a signal related to said equivalent wavelength modulated by an equivalent coherence signal envelope that limits any interference effect to a range within said equivalent coherence length, said signal corresponding to said interference fringes, said equivalent coherence envelope corresponding to fringe contrast for said fringes; and analyzing said measurement data for determining a surface height corresponding to each of said image pixels.

2. A method for profiling an object surface in accordance with claim 1 wherein said measurement data generating step comprises the step of transducing said interference pattern over an array of image pixels.

3. A method for profiling an object surface in accordance with claim 2 wherein said transducing step comprises the step of transducing said interference pattern with a camera means comprising an array of photodetectors.

4. A method for profiling an object surface in accordance with claim 2 wherein said analyzing step comprises the step of analyzing said measurement data by computer means.

5. A method for profiling an object surface in accordance with claim 1 wherein said analyzing step comprises the step of analyzing said measurement data by computer means.

6. A method for profiling an object surface in accordance with claim 1 wherein said measurement data generating step comprises the step of providing a known scan position for which said fringe contrast is a maximum for providing a measure of the relative height of a particular surface point on said object surface.

7. A method for profiling an object surface in accordance with claim 1 wherein said measurement data generating step further comprises the step of transforming said interference pattern into a spatial frequency domain, and said analyzing step comprises the step of examining phase of said transformed interference pattern as a function of spatial frequency for providing the surface height for each point on said object surface.

8. A method for profiling an object surface in accordance with claim 7 wherein said transforming step comprises the step of transforming said interference pattern into said spatial frequency domain by Fourier analysis.

9. A method for profiling an object surface in accordance with claim 1 wherein said illuminating step comprises the step of illuminating said desensitized interferometer means with a laser light source.

10. A method for profiling an object surface in accordance with claim 1 wherein said illuminating step comprises the step of illuminating said desensitized interferometer means with an incandescent lamp light source.

11. A method for profiling an object surface in accordance with claim 1 wherein said illuminating step comprises the step of illuminating said desensitized interferometer means with a light emitting diode light source.

12. A method for profiling an object surface in accordance with claim 1 wherein said illuminating step further comprises the step of providing high contract desensitized interference fringes within a depth range comprising said equivalent coherence length.

13. A method for profiling an object surface in accordance with claim 1 wherein said measurement data generating step comprises the step of depth scanning said object for providing said variation of intensity as a function of said scan position.

14. A method for profiling an object surface in accordance with claim 13 wherein said depth scanning step comprises the step of displacing said object in a direction substantially perpendicular to the surface illuminated by said desensitized interferometer means.

15. A method for profiling an object surface in accordance with claim 14 wherein said measurement data generating step further comprise the step of performing a plurality of intensity measurements during a continuous depth scan of said object for providing an array of interferograms, one for each of said image pixels.

16. A method for profiling an object surface in accordance with claim 13 wherein said measurement data generating step further comprises the step of performing a plurality of intensity measurements during a continuous depth scan of said object for providing an array of interferograms, one for each of said image pixels.

17. A method for profiling an object surface in accordance with claim 1 wherein said range with said equivalent coherence length comprises a depth range given by the expression $|p+z-z_0| \leq L/2$ wherein L is said equivalent coherence length, p is the local surface height on said object surface, z is the scan position, and zo is a constant, whereby p varies with the position on said object surface and comprises a measure of the object surface topography.

18. A method for profiling an object surface in accordance with claim 1 wherein said measurement data generating step comprise the step of displacing said object with respect to said desensitized interferometer means by a known amount while substantially at the same time recording photodetector data in electronic memory means.

19. A method for profiling an object surface in accordance with claim 18 wherein said measurement data generating step further comprises the step of transducing said interference pattern over an array of image pixels for providing said photodetector data.

20. A method for profiling an object surface in accordance with claim 1 wherein said convenient working distance is greater than the depth of the structure on said object surface.

21. A method for profiling an object surface in accordance with claim 1 wherein said signal comprises an approximately oscillatory signal.

22. A method for profiling an object surface in accordance with claim 18 wherein said signal comprises an approximately oscillatory signal.

23. An optical profiler system for measuring the surface profile of an object, said system comprising illumination means, said illumination means having an associated wavelength; desensitized interferometer means disposed with respect to said illumination means for being illuminated thereby, said interferometer means illuminating said object with a plurality of beams in substantially the same place but at different angles of incidence, said interferometer means having an associated equivalent wavelength larger than said illumination means associated wavelength and an associated equivalent coherence length, said interferometer means being capable of creating high contrast interference fringes within a range defined by said equivalent coherence length for said interferometer means; detection means disposed with respect to said interferometer means for detecting an interference pattern; scanning means for mounting said object thereon and disposed for displacing said object with respect to the surface illuminated by said interferometer means for providing depth scanning for said object for providing a variation of intensity as a function of scan position, said variation of intensity comprising a signal related to said equivalent wavelength modulated by an equivalent coherence signal envelope that limits any interference effect to said range, said signal corresponding to said interference fringes, said equivalent coherence envelope corresponding to said fringe contrast for said fringes, said detection means detecting said intensity variation for providing an interferogram for at least one image pixel in view of said profiler; and means for providing a surface height on said object surface corresponding to said at least one image pixel.

24. An optical profiler system in accordance with claim 23 wherein said detection means comprises means for providing an interferogram for each image pixel in said field of view, said surface height providing means comprising means for providing said surface height for each of said image pixels.

25. An optical profiler system in accordance with claim 23 wherein said scanning means comprises means for providing a continuous depth scan of said object, said detection means performing a plurality of intensity measurements during said continuous depth scanning of said object.

26. An optical profiler system in accordance with claim 25 wherein said detection means further comprises storage means for storing said detected interferogram, said surface height providing means providing said surface height from said stored interferogram.

27. An optical profiler system in accordance with claim 23 wherein said range is given by the expression $|p+z-z_0| \leq L/2$ where L is said equivalent coherence length, is the local surface height, z is the scan position, and zo is a constant, whereby p varies with the position on said object surface and comprises a measure of the object surface topography.

28. An optical profiler system in accordance with claim 23 wherein said illumination means comprises a source of spatially incoherent illumination.

29. An optical profiler system in accordance with claim 23 wherein said illumination means comprises a laser.

30. An optical profiler system in accordance with claim 23 wherein said illumination means comprises an incandescent lamp.

31. An optical profiler system in accordance with claim 23 wherein said illumination means comprises light emitting diode means.

32. An optical profiler system in accordance with claim 23 wherein said signal comprises an approximately oscillatory signal.

33. An optical profiler system in accordance with claim 23 wherein said detection means comprises photodetector means, said scanning means comprising means for displacing said object with respect to said interferometer means by a known amount while substantially at the same time detecting said intensity variation with said photodetector means.

* * * * *